(No Model.)
W. N. MORRELL & C. A. EDDY.
WAGON BODY.
No. 412,778. Patented Oct. 15, 1889.
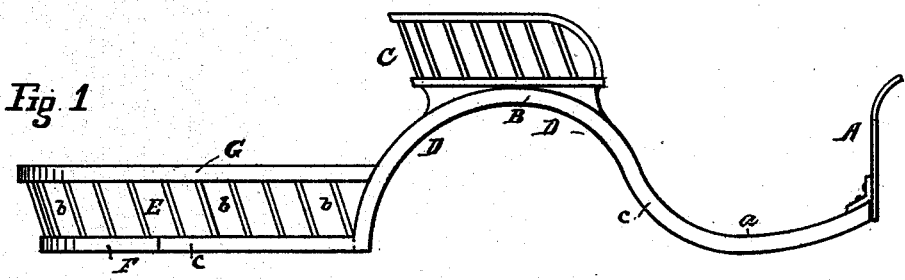
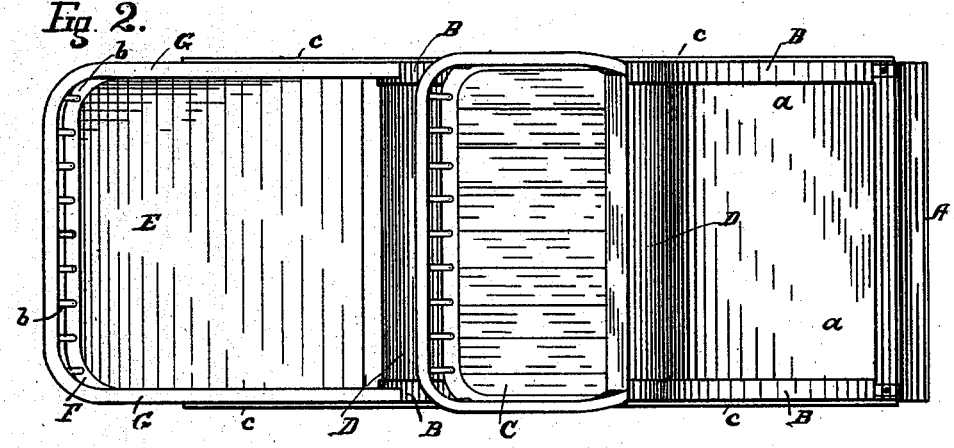
Witnesses.
W. D. Birrall
A. J. Smith
Inventors.
William N. Morrell
Charles A. Eddy
By F. F. Warner
their atty.

UNITED STATES PATENT OFFICE.

WILLIAM N. MORRELL AND CHARLES A. EDDY, OF WATERLOO, NEW YORK.

WAGON-BODY.

SPECIFICATION forming part of Letters Patent No. 412,778, dated October 15, 1889.

Application filed February 1, 1889. Serial No. 298,348. (No model.)

*To all whom it may concern:*

Be it known that we, WILLIAM N. MORRELL and CHARLES A. EDDY, citizens of the United States, and residents of Waterloo, in the county of Seneca and State of New York, have invented certain new and useful Improvements in Wagon-Bodies, of which the following is a specification.

Our invention relates to improvements in that class of wagons or vehicles commonly known as "road-wagons," adapted to carry the driver or other persons besides the driver upon the driver's seat. Within this class is a species of wagons also intended or adapted to carry light loads, such as miscellaneous small parcels or packages. As examples of the class of wagons last above referred to, we may mention the common or well-known light "express-wagon" and "buckboard-wagons," as well as "delivery-wagons," as some of the same class are also called. We desire to state, however, that the class of wagons to which we have now particularly referred have not only had comparatively long bodies, but that the bodies have either been mounted quite high above the wheel-axles, or else the forward wheels have been made quite small in order to enable the driver or teamster to make short or quick turns when occasion required. To facilitate this quick or short turning movement in the class of vehicles now particularly referred to is the purpose of our invention, and, incidentally to this, to make the body containing our improvements in such a way that it may be mounted upon any well-known or common kind of truck or running or supporting gear. These objects we attain by the means hereinafter fully described, and illustrated in the accompanying drawings, in which—

Figure 1 is a side elevation of a wagon-body embodying our invention, and Fig. 2 is a top or plan view of the same.

Like letters of reference indicate like parts.

As our improvements only appertain to the body of the vehicle, we have not here shown the other parts thereof, which, as before stated, may be like those now in use and well known.

A represents the dash-board.

B B are the side bars constituting the rockers or sills. These sills are connected, as usual, by one or more intermediate boards, the forward portion of which forms the foot-rest $a$.

It will be perceived on reference to the drawings that the side bars, rockers, or sills B B are arched next behind the foot-rest, and that the seat C is mounted upon the top of this arch. This arch or "cut-under" D terminates at its rear end about upon the same level or horizontal plane with the foot-rest, as will be perceived, and from the rear end of the said arch extends a platform or horizontal extension E.

F is the lower rail of the platform E, and $b\ b$ are spindles extending upwardly from the said rail and supporting an upper rail G. Both of these rails may be secured to the rearwardly-depending portion of the sills B B in any suitable way. In practice we prefer to make the rail F and the rail G each in one piece, and both having rounded rear corners, as shown. We also deem it preferable to make the sills B B each in one piece of wood, and to strengthen them by means of outer bars of iron $c\ c$, applied to each in any suitable way, and extending thence partly along the rail F, as shown, to assist in supporting the platform E; but these sills or side pieces may each be made either all of wood or all of iron or other metal.

We may further point out a distinctive feature of our invention by calling attention to the fact that the platform E is horizontal, that it has an open top, and is arranged conveniently behind the seat. It constitutes a convenient receptacle for small parcels, packages, or bundles, and we may add further that it is not absolutely essential that the sides and end of this parcel-holder should consist of spindles, as shown, but that they may also consist of full or solid panels instead.

It will be observed from the foregoing description, and on reference to the drawings, that a vehicle of the class referred to, when made as described and shown, will possess the advantage of being capable of being turned in small circles without diminishing in any way any advantage which vehicles of the class referred to may already possess.

Having thus described our invention, what we claim as new, and desire to secure by Letters Patent, is—

In the class of vehicles or road-wagons hereinbefore specified, a body in which are combined the rockers or sills B B, arched as described, and the rail F, attached or connected to the said sills and made in one piece extending continuously along the sides and rear end of a platform E, of which it forms a part, substantially as and for the purposes specified.

Signed at Waterloo, in the county of Seneca and State of New York.

WILLIAM N. MORRELL.
CHARLES A. EDDY.

Witnesses:
  W. D. BURRALL,
  S. H. BURRALL.